US007805755B2

(12) United States Patent
Brown et al.

(10) Patent No.: US 7,805,755 B2
(45) Date of Patent: Sep. 28, 2010

(54) SYSTEM AND METHOD FOR APPLICATION AUTHORIZATION

(75) Inventors: Michael K. Brown, Kitchener (CA); Michael S. Brown, Waterloo (CA); Herbert A. Little, Waterloo (CA); Michael G. Kirkup, Waterloo (CA); Neil P. Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 868 days.

(21) Appl. No.: 10/996,406

(22) Filed: Nov. 26, 2004

(65) Prior Publication Data

US 2005/0256878 A1    Nov. 17, 2005

Related U.S. Application Data

(60) Provisional application No. 60/567,749, filed on May 3, 2004.

(51) Int. Cl.
| | |
|---|---|
| G06F 7/04 | (2006.01) |
| G06F 15/16 | (2006.01) |
| G06F 17/30 | (2006.01) |
| G06F 12/14 | (2006.01) |
| G06F 13/00 | (2006.01) |
| H04L 29/06 | (2006.01) |
| G11C 7/00 | (2006.01) |
| H04N 7/16 | (2006.01) |

(52) U.S. Cl. .................. 726/10; 726/6; 726/17; 726/30; 713/156
(58) Field of Classification Search .................. 726/6, 726/10, 17, 30; 713/156
See application file for complete search history.

(56) References Cited

U.S. PATENT DOCUMENTS

| | | | |
|---|---|---|---|
| 6,243,816 B1 | 6/2001 | Fang et al. | |
| 6,263,432 B1 | 7/2001 | Sasmazel et al. | |
| 6,854,056 B1* | 2/2005 | Benantar et al. | 713/156 |
| 7,107,456 B2* | 9/2006 | Baldwin et al. | 713/182 |

(Continued)

FOREIGN PATENT DOCUMENTS

EP    1380916    1/2001

(Continued)

OTHER PUBLICATIONS

Microsoft® Computer Dictionary, Fifth Edition Publisher: Microsoft Press Pub Date: May 1, 2002 Definitions: program, process & thread.*

(Continued)

*Primary Examiner*—Kambiz Zand
*Assistant Examiner*—Benjamin A Kaplan
(74) *Attorney, Agent, or Firm*—Jenna L. Wilson; Dimock Stratton LLP

(57) ABSTRACT

A method and system for authorization of applications executing on a device having a key store. Applications obtain an application-level ticket to permit access to one or more key values located in the key store. Each ticket is securely associated with an application and being generated on the determination that the application is a trusted application. Tickets are potentially associated with one key value in the key store, with a subset of key values in the key store, or with all key values in the key store. Access to key values by an application is possible independently of a user providing a password for each such access.

23 Claims, 2 Drawing Sheets

U.S. PATENT DOCUMENTS

| | | | |
|---|---|---|---|
| 7,107,610 B2* | 9/2006 | Lortz | 726/4 |
| 2003/0134615 A1* | 7/2003 | Takeuchi | 455/411 |
| 2003/0144991 A1* | 7/2003 | Arrouye et al. | 707/1 |
| 2003/0163376 A1* | 8/2003 | Inoue et al. | 705/14 |
| 2004/0010701 A1* | 1/2004 | Umebayashi et al. | 713/193 |
| 2004/0078565 A1 | 4/2004 | Hofmeister et al. | |
| 2007/0067836 A1* | 3/2007 | Busboom et al. | 726/10 |

FOREIGN PATENT DOCUMENTS

| | | | |
|---|---|---|---|
| EP | 1380916 A1 | 1/2004 | |
| WO | WO 01/06701 A1 | 1/2001 | |
| WO | WO 02/31778 A1 | 4/2002 | |

OTHER PUBLICATIONS

Microsoft Windows CE 3.0 Operating System Configurations http://msdn.microsoft.com/en-us/library/ms834357.aspx © 2000 Microsoft Corporation.*

.NET Security and Cryptography by: Peter Thorsteinson; G. Gnana Arun Ganesh Pub. Date: Aug. 18, 2003.*

Advanced Linux Programming by: Mark Mitchell; Jeffrey Oldham; Alex Samuel Pub. Date: Jun. 11, 2001.*

* cited by examiner

SYSTEM AND METHOD FOR APPLICATION AUTHORIZATION

FIELD OF THE INVENTION

This invention relates generally to computing and communication devices and in particular to authorization for application execution on such devices.

BACKGROUND OF THE INVENTION

As computing and communication devices become increasingly pervasive and as they are relied upon to store and communicate information that is intended to be confidential or trustworthy, the security of such devices becomes increasingly important. This is particularly the case for computing and communication devices that are designed to be mobile. For such devices, such as laptop computers and handheld wireless communication devices, security is often provided using password-protection and encryption of data and communications, as well as other security techniques.

In most cases, such devices permit applications to be executed on the devices and the applications will typically obtain authorization to access data or information to allow the applications to carry out secure operations on the device. One approach to authorization of application execution is to store authorization information in a key store on the device. An application seeking to carry out an operation that requires a key that is in the device key store will typically need to obtain a password from the device user to permit the key store to be accessed.

It is often the case that a single application will carry out repeated steps that require authorization. In such situations, the application may require repeated access to the device key store, with the consequential repeated prompting to the device user to provide a password to allow access to the key store. Such an approach will maintain the security of the device and prevent malicious access by unauthorized users. However, for trusted users of the device the approach potentially results in repeated requests for password information that can make the operation of the device cumbersome or inefficient for the user.

It is therefore desirable to have a method and system to permit an application executing on a device to carry out repeated steps that require authorization without repeatedly prompting the user of the device for password information.

SUMMARY OF THE INVENTION

According to an aspect of the invention there is provided an improved method and system for allowing authorized access for applications.

According to another aspect of the invention there is provided an improved method and system for authorizing application execution by providing application-level tickets. Such tickets are generated to be securely associated with applications on a device, such as a hand-held wireless communication device, and are usable by the applications to access one or more values in a key store on the device.

According to another aspect of the invention there is provided a system for granting access to a key store in a device, the device including one or more memory locations for storing one or more applications executable on the device, the key store including key store entries, the system including a security manager for generating tickets, each ticket being associated with one or more applications and with one or more entries in the key store, and each key store entry being made available to an application on condition that a ticket exists that is associated with the application and with the key store entry.

According to another aspect of the invention there is provided the above system in which the security manager generates tickets that are associated with an application by the ticket including a one-way hash value derived from one or more characteristics of the application.

According to another aspect of the invention there is provided the above system in which the security manager generates tickets that include base tickets and in which tickets potentially reference base tickets to associate one or more applications with multiple entries in the key store.

According to another aspect of the invention there is provided a method for granting access to a key store in a device, the device including one or more memory locations for storing one or more applications executable on the device, the key store including key store entries, the method including the steps of generating tickets, each ticket being associated with one or more applications and with one or more entries in the key store, and granting an application access to key store entries based on one or more tickets associating the application with the key store entries.

According to another aspect of the invention there is provided the above method in which the step of generating tickets includes the step of carrying out a one-way hash operation based on one or more characteristics of the application to define the association of the ticket with the application.

According to another aspect of the invention there is provided the above method in which the step of generating tickets comprises the step of generating base tickets and in which tickets potentially reference base tickets to associate one or more applications with multiple entries in the key store.

A computing device program product comprising computer program code operative to carry out one or more of the above methods.

Advantages of the invention include reduced prompting of device users for passwords to allow applications on a device to access a key store on the device.

BRIEF DESCRIPTION OF THE DRAWINGS

In drawings which illustrate by way of example only a preferred embodiment of the invention.

DETAILED DESCRIPTION OF THE INVENTION

The preferred embodiment of the invention is described with reference to a hand-held mobile communication device and applications that access key store information in such devices. It will be understood by those skilled in the art, however, that other devices that support application access to key store information may also be used.

Figure 1:
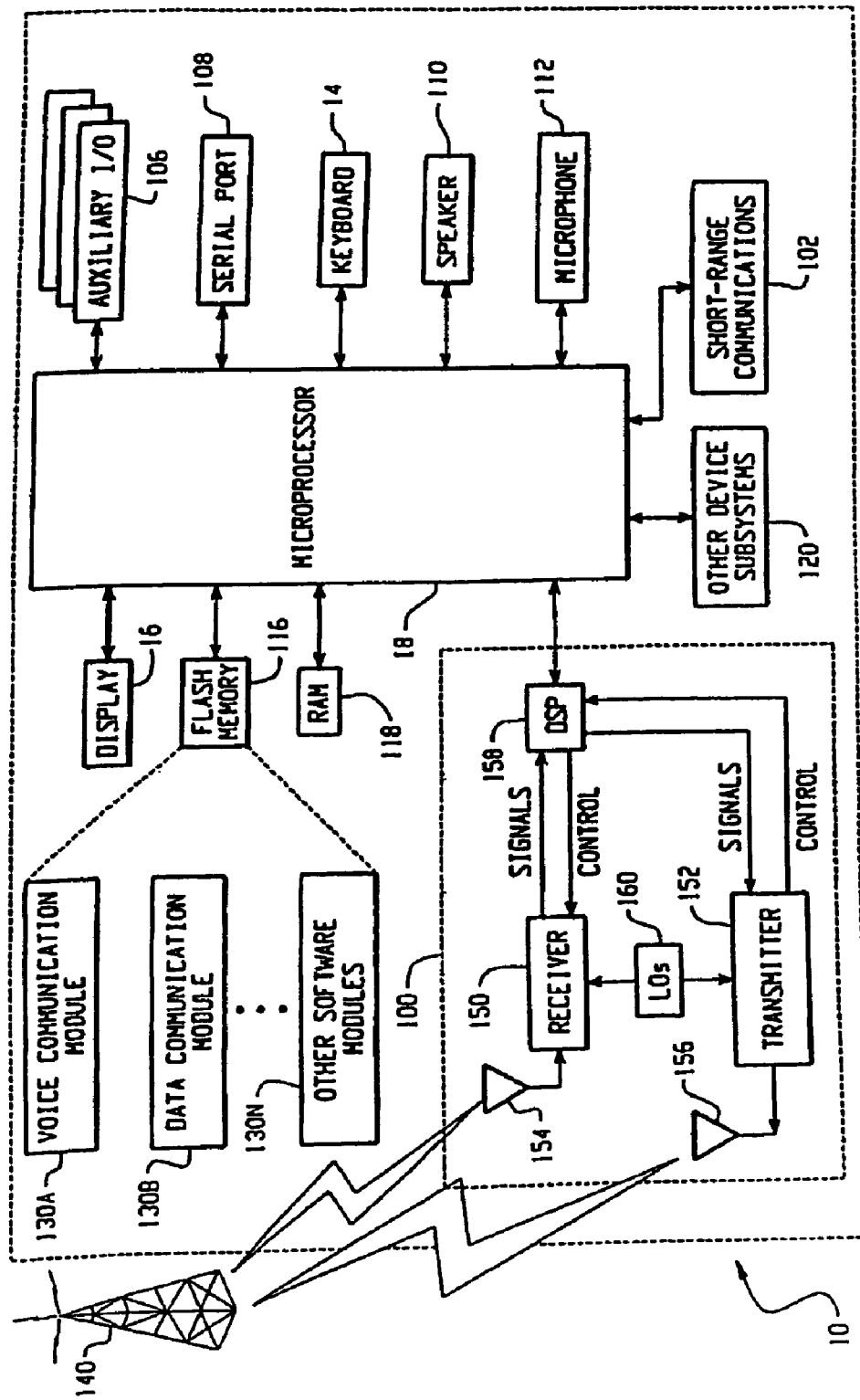
FIG. 1 is a block diagram showing elements of a mobile hand-held device for use in implementing the preferred embodiment of the invention.

FIG. 1 is a block diagram that shows functional elements of hand-held mobile communication devices used in this description as illustrative examples. Hand-held mobile communication device 10 includes a housing 12, a keyboard 14 and an output device 16. The output device shown is a display 16, which is preferably a full graphic LCD. Other types of output devices may alternatively be utilized. A processing device 18, which is shown schematically in FIG. 1, is contained within the housing 12 and is coupled between the keyboard 14 and the display 16. The processing device 18 controls the operation of the display 16, as well as the overall operation of mobile device 10, in response to actuation of keys on the keyboard 14 by the user.

The housing 12 may be elongated vertically, or may take on other sizes and shapes (including clamshell housing structures). The keyboard may include a mode selection key, or other hardware or software for switching between text entry and telephony entry.

In addition to the processing device 18, other parts of mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. Mobile device 10 is preferably a two-way RF (radio frequency) communication device having voice and data communication capabilities. In addition, mobile device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. As is described in more detail below, other applications are also able to execute on the device.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which mobile device 10 is intended to operate. For example, mobile device 10 may include a communication subsystem 100 designed to operate with the Mobitex™, Data TAC™ or General Packet Radio Service (GPRS) mobile data communication networks and also designed to operate with any of a variety of voice communication networks, including networks such as AMPS, TDMA, CDMA, PCS, and GSM. Other types of data and voice networks, both separate and integrated, may also be utilized with mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

As referred to above, a device such as the mobile communication device described typically includes memory for storing applications. Application program code is stored in one or more memory locations in the device and the application program code is executed as required, typically in response to input from the device user. In devices where security in the operations or communications is required, application authorization may be needed before an application, or parts of it, are able to execute and/or access certain secure locations on the device. In one approach to managing application authorization, an application will acquire one or more key values in a key store located on the device. The possession of such a key value permits the application to execute in accordance with the security features of the device or to access secure locations on the device. For example, an email application may require a private key to decrypt email messages that are sent to the device by correspondents using a public key encryption scheme. This key may be located in the key store on the device. Access by applications to the key store is restricted to ensure that only appropriately authorized applications are able to obtain keys or to modify the key store itself. In some implementations, the key store may also store public information, such as public keys for correspondents, as well as private information, such as the user's private keys. In these instances, applications may only require authorization to access the private information, which is typically encrypted.

In one prior art approach to application authorization, user prompts for passwords are required each time that an application seeks to access the key store. In this approach, execution of the application will result in the user being prompted for a secret password. If the correct password is provided by the user to the application, the application will be granted authorization to access the key store on the device and to retrieve the appropriate key or to make the appropriate changes to the key store (for example, changing a key value or adding a key value). With the key, the application is able to carry out the operation that requires the key.

In the preferred embodiment, application authorization is carried out by applications obtaining application-level tickets that are used to permit access to a key store. By associating such tickets with applications, it is possible for an application on a device to become a trusted application. This is achieved by the application being associated with a particular ticket. Consequently, the application is able to access the key store of the device without requiring a user to re-enter a password for each access to the key store that is made. Further, in some implementations, the password entered by the user may itself be discarded by the application after receipt of the appropriate ticket. In such an implementation, a security manager retains password information but the application itself does not retain password information. This implementation may be advantageous when it is considered that an application retaining password information is a potential risk to device security. Alternatively, an application may cache a password. The use of tickets in the preferred embodiment, as described, permits the authorization for key store access to be made independently of the retention of, or the repeated acquisition of, passwords by applications.

Figure 2:
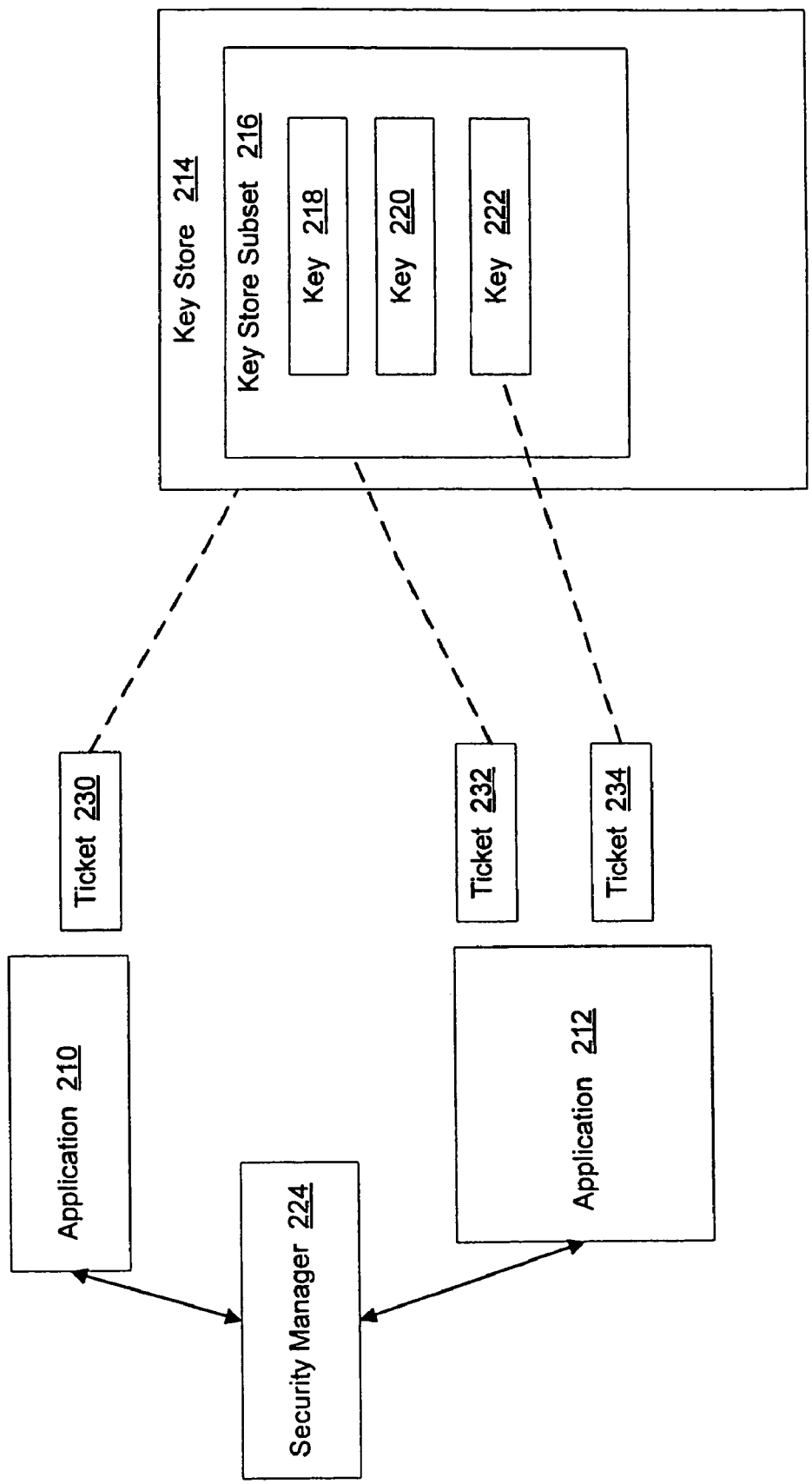
FIG. 2 is a block diagram showing an example interrelationship of applications, tickets, and a key store, in accordance with the preferred embodiment of the invention.

FIG. 2 is a block diagram showing an example arrangement in which applications 210, 212 are executable on a device. The device of the example includes key store 214. As will be appreciated by those in the art, key store 214 may be implemented to have various different configurations. The example of FIG. 2 includes key store subset 216. Within key store subset 216, key values 218, 220, 222 are shown in FIG. 2. The example of FIG. 2 is a simple schematic representation intended to illustrate the manner in which key values may be arranged to be referenced as individual key values, as subsets of key values, or as the entire key store.

In the example of FIG. 2, the device includes security manager 224. In the preferred embodiment, security manager 224 carries out defined security functions, including the provision of tickets used by applications, as described in more detail below. Security manager 224 is illustrated as a separate element in FIG. 2. However, the function of generating tickets for applications carried out by security manager 224 may also be included in functionality implemented as part of key store 214. An implementation of key store 214 that includes the functions described below for security manager 224 is a design choice that is available in implementing the preferred embodiment.

In FIG. 2, security manager 224 is shown as accessible by applications 210, 212. Security manager 224 generates tickets that are associated with applications, on request. In the preferred embodiment, tickets are relatively long-lived objects that are used to permit applications to access some or all of the key store without requiring a user to provide the application with a password for each access.

In the example of FIG. 2, security manager 224 is shown as accessible by application 210. In operation, application 210 may request a ticket from security manager 224. The context for such a request is typically where an application seeks to access key store 214 and requires authorization to make such access. In the preferred embodiment, application 210 may have a user-supplied password cached in the application. However, such a cached password will be potentially lost if the application execution is interrupted and resumed. In the preferred embodiment example of FIG. 2, when application 210 seeks to access key store 214 a first step is to determine if application 210 has the appropriate password cached. If not (and if no appropriate ticket exists), then application 210 will prompt the device user for the appropriate password. On receipt of the password requested, application 210 may then prompt the device user to determine if the application is trusted. Alternatively, security manager 224 may include logic to determine if the application is to be treated as trusted. The device administrator may set different security policies that will determine how easily an application qualifies as trusted or not.

If the user or the logic in security manager 224 indicates that application 210 is trusted, an appropriate ticket is issued. In the preferred embodiment, the ticket is requested by application 210 calling an API (application program interface) method IssueTicket. The successful result of requesting a ticket is shown in the example of FIG. 2 by an object, ticket 230 in FIG. 2, being returned to the requesting application. In the preferred embodiment, ticket 230 is associated with application 210 by a one-way hash of application 210 mapping to ticket 230. Security manager 224 establishes this association and securely stores the hash of the application. Consequently, key store 214 is able to rely on the association between application 210 and ticket 230, once the ticket is generated and securely associated with application 210. Other methods of carrying out such a secure association are possible.

In the example shown in FIG. 2, application 212 has associated with it tickets 232, 234. These tickets are obtained by application 212 and are securely associated with application 212 in a manner similar to that described for the application 210 and ticket 230, above.

When an application is associated with a ticket, that application is able to use the ticket to gain access to those parts of the key store that the ticket specifies. In this way, for example, application 210 may exist and, if ticket 230 remains valid (the validity of the tickets is described in more detail below), then if application 210 resumes execution, it may use ticket 230 to access key store 214 instead of having to prompt the user for a password. In this manner, an application-level ticket reduces the number of prompts for passwords that a device user is likely to face in modifying security settings or running applications that require the use of keys for their operation. Further, as described above, the authorization of an application to access the key store is made independent of the application retaining or obtaining a password.

In the example of FIG. 2, ticket 230 is shown (by the dashed line) as being associated with the entire key store 214. This example reflects authorization for application 210 to access the entire contents of key store 214. As will be appreciated, such access is not intended to be granted to an application unless the application is established to have a very high degree of trustworthiness. An application that is given such wide access to key store 214 is potentially able to erroneously or maliciously make changes to or access the contents of key store 214. It is therefore desirable to restrict the number of such applications. In the preferred embodiment, tickets may be associated with subsets of key stores, or with individual key values in the key store.

In FIG. 2, application 212 is shown as being associated with (or possessing) ticket 232. This ticket is shown as being associated with key store subset 216. Thus application 212 is granted, by virtue of ticket 232 access to all keys stored in key store subset 216. As will be appreciated by those skilled in the art, key store subset 216 need not be a contiguous set of key store memory locations but is rather an identifiable subset of the keys found in key store 214. Application 212 is therefore not able to rely on ticket 232 to obtain access to all keys in key store 214 but is able to access those keys that are identified as being within key store subset 216. The association of ticket 230 with key store 214 and ticket 232 with key store subset 216 may be implemented in different ways. As described above, the key store itself may be defined to have a structure so that tickets may be directly associated with different subsets or the entire key store. An alternative approach is to define a base ticket that can be used to generate tickets for individual keys in the key store. The relationship between keys in the key store may, in this alternative approach, be expressed in the manner in which tickets are defined, rather than in how the key store itself is defined. In either approach, the ticket will be able to ultimately specify whether one or more keys are available to the application requesting access.

In FIG. 2, application 212 is shown as possessing ticket 234, also. In the example of FIG. 2, ticket 234 is associated only with key 222 in key store 214. Therefore ticket 234 provides authorization to application 212 only to access key 222 and not other keys in key store 214.

A further aspect of tickets is that in the preferred embodiment tickets are potentially time-limited. After a certain period, the ticket may be revoked by security manager 224. In the example of FIG. 2, ticket 232 may expire before ticket 234. Consequently, application 212 has authorization to access all keys in key store subset 216 until the expiry of ticket 232. Following this, application 212 will require a further user or system confirmation to be provided with a further ticket. However, because ticket 234 has a longer lifespan than ticket 232, application 212 is able to access key 222 without further authorization, even when ticket 232 has expired. In an alternate implementation, the security manager 224 may be periodically instructed to revoke the tickets 230, 232, 234. For instance, an application configured to clear the contents of the memory of device 10 may periodically request the security manager 224 to revoke issued tickets.

As is described above, the use of tickets allows applications to avoid having to retain passwords. Tickets may or may not include password information. The design decision to include password information or not will be made based on implementation objectives for the device in question. In an implementation of the preferred embodiment in which password information is included in the tickets, the authorization for an application to access a key may be determined by comparing the ticket password with a password value in the key store to permit or deny application access to values in the key store. To effectively end the validity of a ticket, the corresponding password in the key store may be changed or deleted. Thus the password in the ticket will no longer match a password in the key store and authorization for the application is effectively revoked.

According to the preferred embodiment set out above, different application-level tickets may be generated and may allow applications to: (1) add, delete or change records in the key store, (2) access secure locations to obtain, for example, private key information stored in the device, and (3) access security certificate status items as well as security certificates themselves. The preferred embodiment includes the ability to define applications as being trusted by issuing a ticket that is associated with the application and that permits access to the key store to potentially carry out the operations listed above.

Various embodiments of the present invention having been thus described in detail by way of example, it will be apparent to those skilled in the art that variations and modifications may be made without departing from the invention.

We claim:

1. A system for granting access to key store entries in a device, the device comprising one or more memory locations for storing one or more applications executable on the device, the system comprising:
    a key store comprising the key store entries; and
    a microprocessor configured to generate tickets, each ticket being associated with one or more applications and with one or more key store entries in the key store, each ticket comprising information to permit the one or more applications thus associated to carry out at least one of:
        accessing secure locations, or
        accessing security certificates,
    each key store entry comprised in the key store being made available to at least one executing application on condition that a ticket exists that is associated with the application and with the key store entry.

2. The system of claim 1 in which the microprocessor generates tickets that are associated with an application by the ticket comprising a one-way hash value derived from one or more characteristics of the application.

3. The system of claim 1 wherein the microprocessor is configured to:
    define a base ticket associated with the key store; and
    generate, using the base ticket, further tickets associated with one or more applications and with one or more key store entries.

4. The system of claim 1 in which the microprocessor provides each ticket with a time stamp and which renders tickets invalid after a predetermined time period.

5. The system of claim 1 in which tickets comprise information to variably permit associated executing applications to further carry out at least one of the following actions:
    add, delete or change key store entries in the key store, or
    access security certificate status information.

6. The system of claim 1 in which the microprocessor maintains password information for the device.

7. The system of claim 1 in which the device is a handheld wireless communications device.

8. The system of claim 1, wherein the microprocessor is configured to generate tickets in response to a request from an application for access to the key store.

9. The system of claim 1 wherein each ticket is associated with all key store entries in the key store.

10. The system of claim 1, wherein access to one or more of the key store entries by the at least one executing applications normally requires password authorization, and wherein the key store entry is made available to the at least one executing application without requiring password authorization on the condition that a ticket exists that is associated with the application and with the key store entry.

11. A method for granting access to key store entries comprised in a key store in a device, the device comprising a microprocessor and one or more memory locations for storing one or more applications executable on the device, the method comprising the steps of:
   the microprocessor generating tickets, each ticket being associated with one or more applications and with one or more key store entries in the key store, each ticket comprising information to permit the one or more applications thus associated to carry out at least one of:
      accessing secure locations, or
      accessing security certificates; and
   the microprocessor granting an executing application access to a key store entry if a ticket exists that is associated with the application and with said key store entry.

12. The method of claim 11 in which the step of generating tickets comprises the step of carrying out a one-way hash operation based on one or more characteristics of the application to define the association of the ticket with the application.

13. The method of claim 11 in which the step of generating tickets comprises:
   defining abuse ticket associated with the key store; and
   generating, using the base ticket, further tickets associated with one or more applications and with one or more key store entries.

14. The method of claim 11 further comprising the step of providing each ticket with a time stamp and the step of rendering tickets invalid after a predetermined time period.

15. The method of claim 11, wherein tickets comprise information to variably permit associated applications to:
   add, delete or change key store entries in the key store; or
   access security certificate status information.

16. The method of claim 11, further comprising the microprocessor receiving a request from an application for access to the key store.

17. The method of claim 11 wherein each ticket is associated with all key store entries in the key store.

18. The method of claim 11, wherein access to one or more of the key store entries by the executing application normally requires password authorization, and granting the executing application access to the key store entry comprises granting said access without requiring password authorization.

19. A computing device program product comprising a computer-readable medium storing computer program code, said computer program code adapted to be executed to perform a method on a device, the device comprising a key store, a microprocessor and one or more memory locations for storing one or more applications executable on the device, the method comprising:
   the microprocessor generating tickets, each ticket being associated with one or more applications and with one or more key store entries in the key store, each ticket comprising information to permit the one or more applications thus associated to carry out at least one of:
      accessing secure locations, or
      accessing security certificates; and
   the microprocessor granting an executing application access to a key store entry if a ticket exists that is associated with the application and with said key store entry.

20. The computing device program product of claim 19, wherein generating tickets comprises carrying out a one-way hash operation based on one or more characteristics of the application to define the association of the ticket with the application.

21. The computing device program product of claim 19, wherein generating tickets comprises:
   defining a base ticket associated with the key store; and
   generating, using the base ticket, further tickets associated with one or more applications and with one or more key store entries.

22. The computing device program product of claim 19, the method further comprising providing each ticket with a time stamp and the step of rendering tickets invalid after a predetermined time period.

23. The computing device program product of claim 19, wherein tickets comprise information to variably permit associated applications to:
   add, delete or change key store entries in the key store; or
   access security certificate status information.

* * * * *